United States Patent Office 3,057,627
Patented Oct. 9, 1962

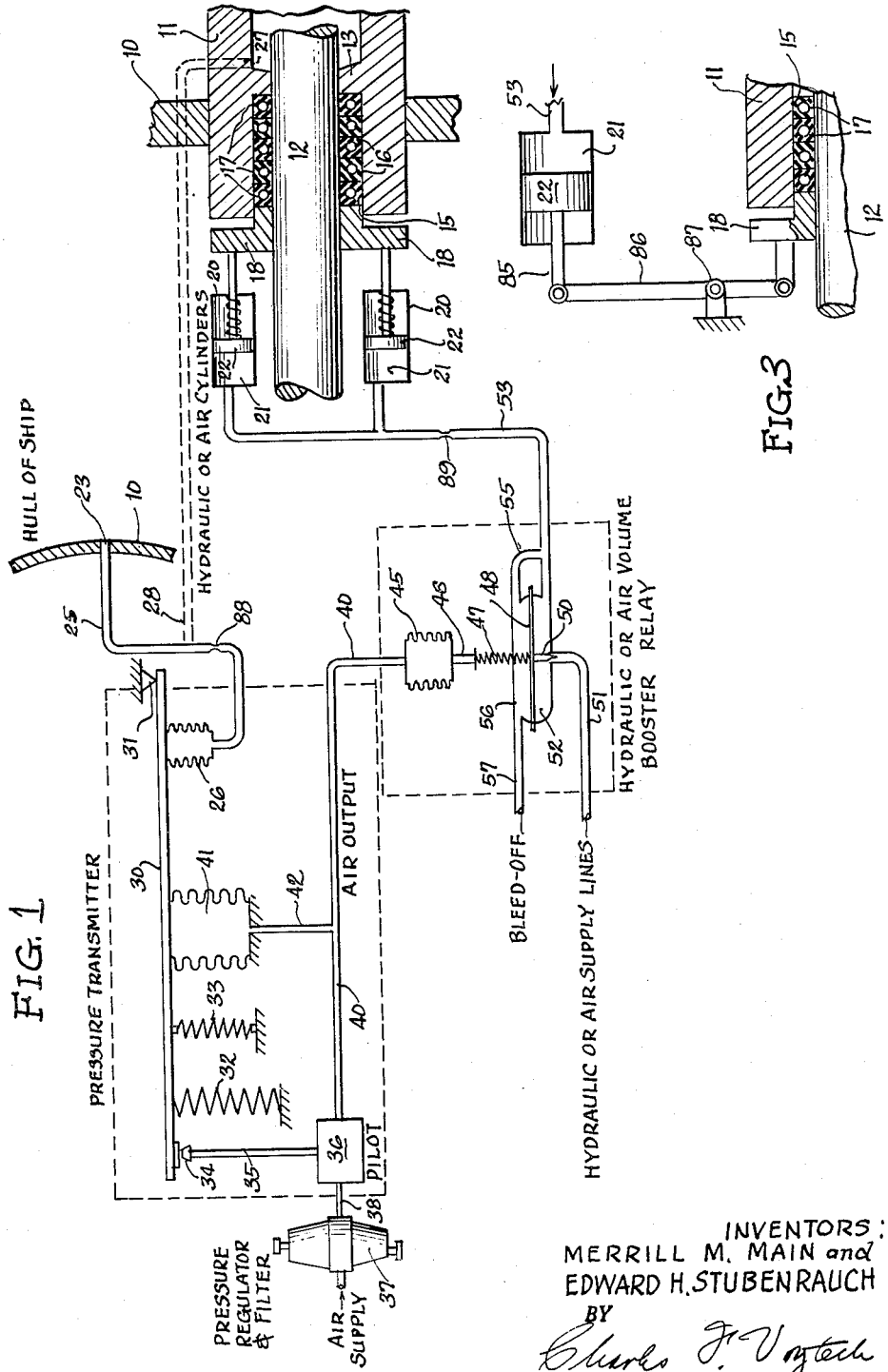

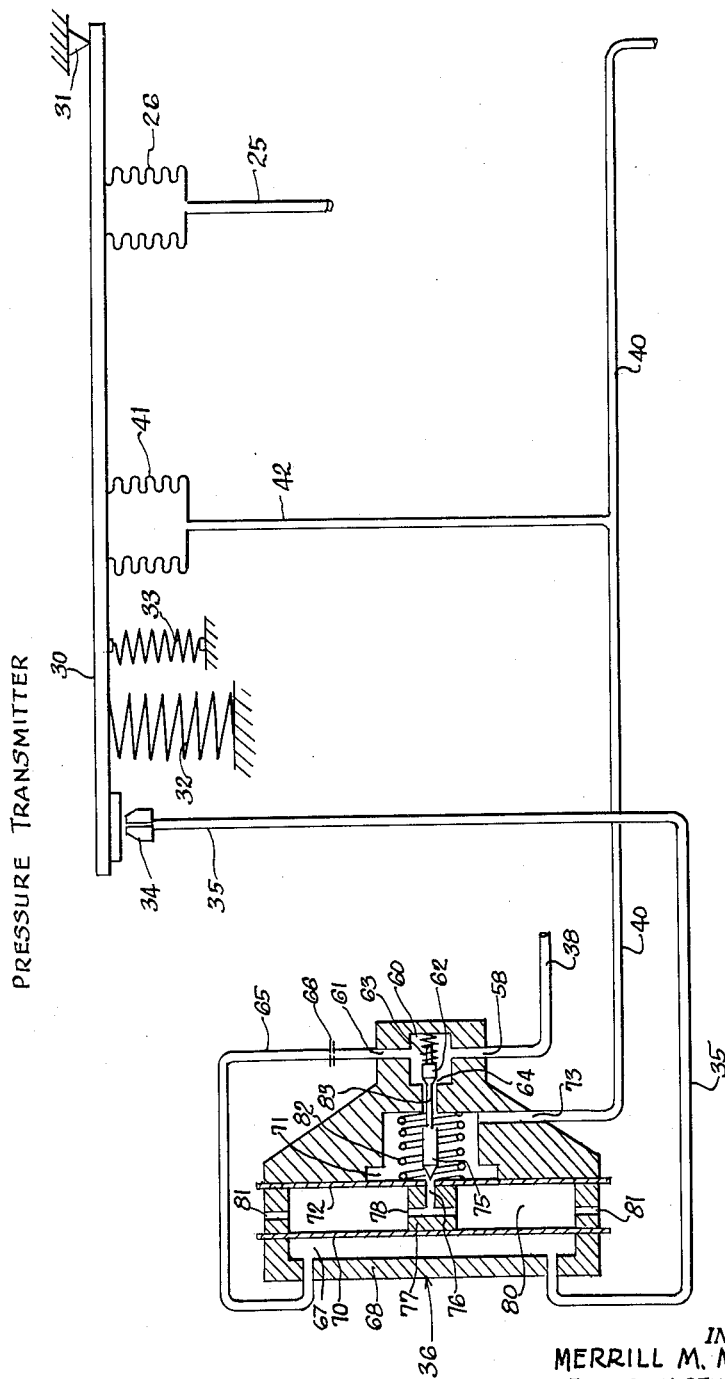

3,057,627
RAPID GLAND ADJUSTMENT
Merrill M. Main, Park Ridge, and Edward H.
Stubenrauch, Prospect Heights, Ill.
Filed Mar. 22, 1960, Ser. No. 16,852
5 Claims. (Cl. 277—3)

This invention relates to a gland adjustment to tighten packing in a seal that prevents leakage around a moving shaft, and particularly to a seal that compensates for varying requirements to prevent leakage around a submarine propeller shaft.

Sealing the drive or propeller shaft of watercraft is accomplished by passing the shaft through a cylindrical housing in the hull of the vessel. The seal is maintained by packing the housing tightly with deformable waterproof material such as greased impregnated felt or rope, rubber rings, metal foil wrapped flax, or the like. The packing is adjusted to be tight enough to keep any significant amount of water from leaking through the packing but not so tight as to overheat the shaft due to friction while rotating within the packed housing. The limited draft of surface vessels permits the use of packing that need withstand only relatively low pressure and which may function with no leakage at all. These packed seals also can function for long periods without adjustment or maintenance, and then a small tightening adjustment is all that is necessary.

Sealing the drive shaft of a submarine presents many problems not encountered in surface vessels. Since submarines function at varying depths down to hundreds of feet below the surface, their shaft seals must be capable of withstanding tremendous pressures and must be much more effective seals than those used on surface vessels. Tighter, more effective seals necessarily exert greater pressure against the surface of the shaft which results in more frictional resistance to rotation and thereby create a problem of scoring the shaft because of the excessive heat that is developed in rotating against the tight packing. The shaft may be maintained cool and lubricated by permitting a small amount of water leakage through the seal, but any change in depth will result either in excessive leakage if the vessel goes deeper, or no leakage resulting in overheating and scoring of the shaft if the vessel goes to shallower water. When operating beneath the surface, a submarine presently needs at least one man attending the shaft seal at all times, and he must make manual adjustments based on his own observations, which is unsatisfactory both from the standpoint of the speed and accuracy of the adjustment and from the standpoint of an unprofitable use of manpower.

It is an object of this invention to provide a resilient packing for a shaft passing through a wall on one side of which is a fluid of varying pressure, with means responsive to such varying fluid pressure for varying the pressure on the resilient packing, thereby to maintain a substantially constant seal between the shaft and wall irrespective of variations in the pressure of said fluid.

It is another object of this invention to increase and decrease the tightness of a submarine shaft packing responsive to the pressure of the water surrounding the submarine.

It is another object of this invention to provide a pressure sensing device which is sensitive to the water pressure outside of a submarine hull, which device actuates a force exerting means which in turn exerts force on packing surrounding a submarine shaft that is directly proportional to the water pressure surrounding the submarine hull.

These and other objects are accomplished by this invention which includes a combination of an elastic packing material in an ordinary seal housing which is maintained tight by fluid operated prime movers such as hydraulic or pneumatic operated pistons. It is essential in this invention that the packing be resilient or elastic and preferably self-restoring to substantially its original shape and position when the pressure exerted by the fluid operated prime movers is released. A tap through the submarine hull senses the prevailing water pressure outside the hull and actuates a pressure transmitting means which produces a supply of air at a proportional pneumatic pressure within the working range of the control system employed. The pressure transmitting means in turn controls a hydraulic or air volume booster relay which is a fluid volume control means for providing high pressure operating fluid to the prime movers at varying pressures proportional to the water pressure. The packing pressure against the shaft is thereby controlled to be responsive to and directly proportional to the water pressure outside of the hull, which is the very pressure that the packing must resist.

This invention may be best explained with reference to the accompanying drawings which illustrate one embodiment of this invention.

FIG. 1 is a schematic diagram of a control system embodying the combination of this invention;

FIG. 2 is a schematic diagram of a pressure transmitting means that acts to control the pressure of the prime mover fluid to be directly proportional to the external water pressure; and FIG. 3 is a schematic diagram of a force multiplying means that may be employed in the combination of this invention.

The hull 10 of a submarine has a propeller shaft housing 11 passing through it to provide a means for the shaft 12 to pass from within the hull to the propeller or screw. The housing has a bearing portion 13 and a diametrically enlarged packing chamber 15 which is packed with sealing material such as packing rings 16. The packing rings 16 are necessarily of a resilient material which is deformable when force is applied to it, but which tends to regain its original shape when the force is released. Rings of rubber, neoprene, or a homogeneous mixture of asbestos, graphite and a binder, or other resilient materials may be employed, and they may be solid, hollow or have a core of a second deformable material such as a hollow rubber core in a plastic material. The rings 16 shown herein have a deformable plastic core 17 and are preferably artificial rubber. When rings are used, they are preferably split for easy installation and arranged on the shaft with the split portions of adjacent rings diametrically opposed.

The packing is maintained under compression and distorted to exert force against both the housing 11 and the shaft 12. There is no relative motion between housing 11 and packing rings 16 and the seal effected between them may be as tight as desired with no adverse effects. Since there is no relative motion at this point, there is no friction and no wear, and accordingly slightly oversized rings may be employed as far as the outside diameter of the rings is concerned.

The relative motion between the shaft 12 and the inside diameter of the packing rings gives rise to wear and heat due to friction. Consequently, the rings 16 in their undistorted condition preferably are not too tight around the shaft 12. The rings rather should fit snugly, and the pressure required to effect a seal should result from distorting the rings to expand radially inwardly by placing them under pressure applied parallel to the axis of rotation of the packed shaft.

Such pressure is applied by forcing gland 18 into housing 11. The force on gland 18 is usually applied with bolts or studs, but in this invention it is applied by a plurality of fluid operated prime movers such as the hydraulic or pneumatic cylinders 20 shown herein. When the fluid in the cylinder portion 21 is under varying pressure, it causes the pistons 22 to exert varying force against the gland 18, thereby placing the packing rings 16 under varying pressure, and creating a shaft seal of varying tightness. The gland 18 is preferably made of two interconnected half cylinders that may be installed around the shaft without disassembling the shaft.

The entire control system is sensitive to and directly proportionl to the water pressure outside the hull 10. A pressure tap 23 opens outside the hull 10 and the fluid pressure is conducted to a pressure transmitter subassembly through conduit 25. Conduit 25 connects to a bellows 26 which expands as the pressure of the fluid increases. As shown in broken lines, a pressure tap 27 immediately adjacent housing 11 may sense the water pressure at that point and the tap may be connected to bellows 26 through conduit 28. This expedient may be desirable since it directly senses the pressure that the packing must resist and need not be compensated for any variations resulting from the relative motion of the vessel in the water.

The bellows 26, in expanding and contracting, moves a lever 30 which is suspended over a fulcrum 31. Increased pressure in the bellows 26 forces lever 30 to act against tension springs 32 and 33. When springs 32 and 33 are extended, the lever 30 moves to uncover nozzle 34 on the end of conduit 35 extending from pilot valve 36.

A constant pressure air supply from regulator 37 enters pilot valve 36 through tube 38. In pilot valve 36 the air from regulator 37 is regulated as will be hereinafter described so that its pressure is inversely proportional to the pressure outside of hull 10. As air with regulated pressure enters line 40 from tube 38 through pilot valve 36, the pressure increases or decreases in bellows 41, which is directly connected to line 40 through line 42. This pressure causes the bellows 41 to expand when the pressure in line 40 increases and contract when it decreases. When bellows 41 contracts, it exerts a force additive to the force of springs 32 and 33 which resists the force of bellows 26. When bellows 41 expands, it exerts a force additive to the force of bellows 26 to resist the force of the springs. The compensating effect of bellows 41 on springs 32 and 33 and bellows 26 causes the lever arm 30 to seek a stable, equilibrium position with respect to nozzle 34 and causes pilot valve 36 to maintain a constant pressure in line 40 until there is a change in the depth of the vessel. The control system thus far described, is the subassembly known as the pressure transmitter.

The varying pressure of the air in line 40 causes varying pressure in the subassembly identified as a hydraulic or air volume booster relay. Control air enters the booster relay by passing into bellows 45 to which line 40 is directly connected. As the pressure increases, the length of the bellows increases and extends rod 46 thereby increasing the pressure on spring 47 which is connected to diaphragm 48. The other side of diaphragm 48 positions a valve stem 50 which controls the flow of high pressure air or hydraulic fluid from line 51. The fluid from line 51 flows past valve stem 50, into chamber 52 and into line 53 which connects the beforementioned cylinder portions 21 to supply them with high pressure operating fluid. A by-pass 55 connects line 53 with a chamber 56 on the side of the diaphragm 48 connected thereto spring 47 thereby equalizing the pressure of the fluid on both sides of the diaphragm 48.

As hereinbefore described, the pressure transmitter subassembly produces air pressure in line 40 that is inversely proportional to the outside water pressure. Therefore, as the submarine goes to deeper water and the water pressure surrounding the hull increases, the pressure in line 40 will decrease and bellows 45 will contract distorting diaphragm 48 to move stem 50 from its seat. When this happens, more operating fluid may flow from its high pressure source, through line 51, past stem 50 and into line 53. The resultant higher pressure in line 53 causes two effects. First it causes higher pressure in cylinder portions 21 and which results in more force being exerted against gland 18 to distort packing 16, thereby effecting a tighter seal around shaft 12. Second it causes high pressure fluid to flow through by-pass 55, filling chamber 56 and equalizing the pressure on both sides of the diaphragm. With the pressure equalized, the diaphragm moves to close line 51 in a position that maintains an equlibrium setting of stem 50 so that the same amount of fluid enters past stem 50 as is discharged through bleed-off 57. Each depth in which the vessel functions will produce a different degree of expansion or contraction of bellows 45 and consequently a unique setting of valve stem 50 which will in turn produce a unique tightness of the packing that is directly related to the pressure that it must resist at that depth.

As hereinbefore stated, the pressure transmitter subassembly must function to provide an air pressure that is proportional, either directly or inversely, to the water pressure outside the hull. FIG. 2 illustrates a pressure transmitter suitable for use as a part of this combination which provides a pneumatic pressure inversely proportional to the outside water pressure. It is preferred that the pressure transmitter provide pneumatic pressure inversely proportional to the water pressure so that it will fail safe. That is, if the pressure transmitter fails and loses its pressure, the packing will be at maximum tightness and there will be no leakage into the submarine. It is of course evident, that when the pressure transmitter functions to provide pneumatic pressure that is directly proportional to the water pressure, it will be connected to the booster relay to produce the opposite action, i.e., extending bellows 45 will move valve stem 50 out of its seat.

Air supplied through line 38 enters the pilot valve 36 through a port 58 and passes into a chamber 60. Chamber 60 has an open exit port 61 and an exit port 64 shown stopped with a valve stem 62 held in place with spring 63.

A conduit 65 containing a small orifice 66 which severely limits air flow, is connected between port 61 and a chamber 67 formed between the housing 68 and a diaphragm 70. Within housing 68 there is another chamber 71 formed between housing 68 and another diaphragm 72. This second chamber is connected through port 73 to line 40 and the air from this chamber supplies the control air at the desired pressure to line 40. Chamber 71 contains a valve stem 75 which is positioned to seal a port 76 in diaphragm 72. A drilled block 77 is connected between diaphragms 70 and 72 and it contains, in addition to port 76 and connected to port 76, a conduit 78 which discharges first into a chamber 80 and then to the atmosphere through vents 81. A spring 82 in chamber 71 acts to push the diaphragm 72 and port 76 away from valve stem 75.

The function of this pressure transmitter can best be described by following the sequence of events which occur almost simultaneously when an equilibrium position is disturbed. Assume a submarine, after maintaining constant depth, moves to a lesser depth. Decreased pressure in bellows 26 will cause springs 32 and 33 to move the arm 30 closer to the nozzle 34. By partly closing the nozzle 34, the pressure in line 35 increases which in turn increases the pressure in chamber 67. Increased pressure in chamber 67 causes diaphragm 70 to bulge, thereby moving block 77 and diaphragm 72 so that port 76 is sealed by valve stem 75. The movement of diaphragm 72 causes valve stem 75 to move and act through rod 83, which connects valve stems 75 and 62, to move valve stem 62 off of its seat to allow supply air from chamber 60 to flow through port 64. This flow of air increases the pressure in chamber 71 enough to move diaphragm 72 back until valve stem 62 again closes port 64 at which time equilibrium is again established, but with a higher pressure in chamber 71 and line 40 into which it opens.

The resultant higher pressure in line 40 will be transmitted to bellows 41 through line 42 to produce a greater force added to the force produced by bellows 26 in resisting the force of springs 32 and 33, thereby moving lever arm 30 to a position farther from nozzle 34 and one at which a stable equilibrium of the elements of the combination will be maintained at the new depth in which the vessel is operating. As heretofore described, the new pressure in line 40 will, acting through the booster relay assembly, produce a loosening of the packing around shaft 12 by positioning valve stem 50 to diminish the flow of operating fluid.

When the vessel goes again to deeper water, the reverse process occurs. The increased water pressure in bellows 26 causes arm 30 to move away from nozzle 34 which causes diminished pressure in line 35 and chamber 67. The added forces of spring 82 and the pressure against diaphragm 72 will cause diaphragm 70 to collapse slightly into chamber 67. This collapse causes movement of diaphragm 72 away from valve stem 75, thereby causing valve stem 62 to cut off supply air by sealing port 64 and at the same time opening port 76 and permitting air to discharge from chamber 71 and be vented through chamber 80 and vents 81.

This venting causes the pressure in chamber 71, and consequently in line 40 to be diminished and the diminished pressure in turn reduces the force exerted by bellows 41 which causes lever 30 to again assume its equilibrium position with respect to nozzle 34. The new pressure in line 40, which is unique to the particular depth of the vessel, again operates through the booster relay to produce a unique pressure of the packing against the shaft that is directly proportional to the water pressure that it must resist.

The various pressures, forces and the relationships and calibrations thereof may be regulated by any suitable method. For example, in the portion of the assembly identified as the pressure transmitter, the relative sizes of bellows 26 and bellows 41 and their respective distances from fulcrum 31, as well as the placement and strength of springs 32 and 33 may permit the use of almost any absolute pressure in line 40 which may be inversely or directly proportional to the pressure in line 25, although it may be substantially higher or lower. Similarly the force exerted by pistons 22 will depend upon the diameter of the pistons and the absolute pressure of the fluid operating them. If it is desired to employ, for example, low pressure hydraulic fluid, the diameter of pistons 22 may be increased, the number of cylinders may be increased or a mechanical force-multiplying device such as shown in FIG. 3 may be employed. In FIG. 3 the connecting rod 85 of piston 22, instead of directly applying force against gland 18, connects to a lever 86 which operates through a fulcrum 87 to apply force on gland 18 that is multiplied by the placement of fulcrum 87. The arrangement shown in FIG. 3 is particularly desirable because it permits placement of many fluid-operated cylinders around a much larger periphery than the diameter of gland 18. The mechanical force-multiplication means not only permits the use of smaller cylinders, but also permits greater spacing between them, thus improving the ease of construction and maintenance.

Inasmuch as ship hulls, and particularly submarine hulls, are subjected to severe shock pressures produced by explosive charges, safety devices of the type used to protect pressure gauges may be interposed in the conduit from the hull to the pressure transmitter and from the cylinders 21 to the booster relay. These are shown schematically at 88 and 89 as orifices which block the passage of surges, but do not affect normal operation of the transmitter and cylinder.

While this invention has been described with respect to a presently preferred embodiment, it will be appreciated that it is susceptible to many equivalent modifications and variations within its broad scope.

What is claimed is:

1. The combination for automatic adjustment of a submarine propeller shaft seal which comprises a shaft, a seal housing surrounding said shaft where it passes through the hull of said submarine and defining a stuffing box having a cylindrical wall and a radial wall, resilient packing material within said stuffing box in contact with the stuffing box walls and with said shaft, a packing gland slidably surrounding said shaft and extending into said stuffing box to exert an axial pressure upon said packing, a plurality of fluid-operated prime movers mechanically connected to exert varying force directed to push said gland into said stuffing box whereby to exert varying axial pressure against said packing, and means responsive to the water pressure surrounding the hull of said submarine to vary the fluid pressure in said fluid-operated prime movers directly proportional to said water pressure.

2. The combination for automatic adjustment of a submarine propeller shaft seal which comprises a shaft, a seal housing surrounding said shaft where it passes through the hull of said submarine and defining a stuffing box having a cylindrical wall and a radial wall, resilient packing material within said stuffing box in contact with said stuffing box and said shaft, a packing gland slidably surrounding said shaft and extending into said stuffing box to exert an axial pressure upon said packing, a plurality of fluid-operated prime movers mechanically connected to exert varying force directed to push said gland into said stuffing box whereby to exert varying axial pressure against said packing, pressure transmitting means for converting varying water pressure outside said submarine to proportional pneumatic pressure and fluid booster relay means for supplying operating fluid to said prime movers at varying pressures proportional to and responsive to said pneumatic pressure of said pressure transmitting means and directly proportional to said varying water pressure.

3. The combination of claim 1 further characterized in that said resilient packing material comprises synthetic rubber rings having deformable resilient cores surrounded by relatively harder fluid-impervious shells.

4. The combination of claim 1 further characterized in that said resilient packing material comprises rings having a resilient core surrounded by a homogeneous mixture of asbestos, graphite and a binder.

5. The combination for automatic adjustment of a submarine shaft seal which comprises a shaft, a seal housing surrounding said shaft where it passes through the hull of said submarine, resilient packing material within said housing in contact with said housing and said shaft, a packing gland slidably surrounding said shaft and extending into said housing, a plurality of fluid-operated prime movers mechanically connected to said gland to exert varying force directed to push said gland into said housing, pressure transmitting means exposed to the water adjacent said shaft for sensing the water pressure thereat a source of pneumatic pressure, means for regulating the pneumatic pressure from said source responsive to and inversely proportional to said water pressure as transmitted thereto by said pressure transmitting means, and fluid volume flow regulating means adapted to pass fluid at varying pressure to said fluid-operated prime movers, said fluid pressure varying responsive to and inversely proportional to said pneumatic pressure.

References Cited in the file of this patent

UNITED STATES PATENTS

| 512,551 | Kelly | Jan. 9, 1894 |
| 661,664 | Lane | Nov. 13, 1900 |
| 747,846 | Beamer | Dec. 22, 1903 |
| 2,085,777 | Williams | July 6, 1937 |
| 2,350,753 | Grobel | June 6, 1944 |
| 2,401,539 | Benson | June 4, 1946 |
| 2,670,973 | Ginther | Mar. 2, 1954 |
| 2,895,750 | Gardner | July 21, 1959 |